(12) United States Patent
Jensen

(10) Patent No.: US 7,127,698 B2
(45) Date of Patent: Oct. 24, 2006

(54) METHOD FOR REDUCING RETICLE SET COST

(75) Inventor: John Jensen, Portland, OR (US)

(73) Assignee: LSI Logic Corporation, Milpitas, CA (US)

( * ) Notice: Subject to any disclaimer, the term of this patent is extended or adjusted under 35 U.S.C. 154(b) by 569 days.

(21) Appl. No.: 10/417,706

(22) Filed: Apr. 17, 2003

(65) Prior Publication Data

US 2004/0210595 A1   Oct. 21, 2004

(51) Int. Cl.
G06F 17/50 (2006.01)

(52) U.S. Cl. .......................... 716/21; 716/19

(58) Field of Classification Search ................ 716/21, 716/19

See application file for complete search history.

(56) References Cited

U.S. PATENT DOCUMENTS

| | | | | |
|---|---|---|---|---|
| 5,450,332 A * | 9/1995 | Criscuoli et al. | ............. | 716/21 |
| 6,047,116 A * | 4/2000 | Murakami et al. | ............. | 716/19 |
| 6,056,785 A * | 5/2000 | Chisaka | ............. | 716/19 |
| 6,330,708 B1 * | 12/2001 | Parker et al. | ............. | 716/19 |
| 6,463,577 B1 * | 10/2002 | Omata et al. | ............. | 716/21 |
| 6,757,878 B1 * | 6/2004 | Srinivasan et al. | ............. | 716/10 |
| 6,862,725 B1 * | 3/2005 | Takagi et al. | ............. | 716/19 |
| 2002/0148978 A1 * | 10/2002 | Innes et al. | ............. | 250/492.22 |
| 2004/0181769 A1 * | 9/2004 | Kochpatcharin et al. | ...... | 716/19 |

\* cited by examiner

*Primary Examiner*—Sun James Lin
(74) *Attorney, Agent, or Firm*—Trexler, Bushnell, Giangiorgi, Blackstone & Marr, Ltd.

(57) ABSTRACT

A method of making a reticle. Design data, i.e., GDSII data is read in, then a scribe or frame is built, and the design is placed in the scribe. Then, Boolean operations, sizing, OPC corrections and phase shifting are performed, as needed, perhaps using third party tools. Then, the GDS data is sorted, and a new GDS hierarchy is created where each mask layer can be generated as one mask making pattern, i.e., new cells are created representing each masking image location on the reticle, each new cell is placed in a topcell, then a gds2 file is produced where the gds2 file can be used to create a reticle or can be used to create reticle making data.

20 Claims, 3 Drawing Sheets

Standard Reticle:

Using Method:

METHOD FOR REDUCING RETICLE SET COST

BACKGROUND

The present invention generally relates to reticles and methods of making same, and more specifically relates to a method for reducing reticle set cost.

As wafer technologies have become more and more complex, reticle costs have been increasing at a high rate. For example, in G10P (i.e., 0.35 micron node in Tskuba), a full set of reticles for a given device was less than $50,000. In Gflx, the cost of a full set of reticles can exceed $650,000. In G90, the cost for a full set of reticles is expected to be more than $1,500,000.

Many solutions have been attempted to keep reticle costs reasonable. One solution that has been attempted is to place more than one design on a reticle set. A problem is that a multiple chip wafer, which is generated from the multiple chip reticle, is difficult to assemble, saw, and sort (i.e., test). When a wafer is sawed and sorted, one must keep track of which dies are which. While it may be possible to cut each wafer for one type of die, depending on the die size and layout of the die on the wafer, the reticle set cannot be created until all designs are completed, and this may, in turn, delay designs. Additionally, each chip on the wafer may require a different process flow. Assuming there are two designs associated with the reticle set, a common process flow between the two designs must be created. This may be complicated, for example, in the case where one chip is a three layer metal design while the other chip is a four layer metal design. Finally, there is a high probability, depending on die size, that silicon space will be wasted on the wafer. For example, if one die is larger by a non-integer multiplier, generally there is no way to fit the designs on a wafer without leaving open space on the wafer.

Another solution that has been attempted is to use multiple layer reticles. This is a solution that has been used in the industry in connection with Ultratech 1X steppers. The solution involves placing more than one masking layer on each reticle. Individual patterns for each masking layer are given to the mask maker, along with instructions as to where to place the patterns. The mask maker then creates a jobdeck, which places each layer on a given mask in a specified location. The mask maker needs to create the jobdeck correctly, as well as maintain the individual pattern files for each layer. As such, compared to methods used to form standard reticles, this method requires that much more information be transferred to the reticle vendor, and has the potential for having more mistakes.

Still another solution which has been attempted is to reduce reticle specifications and simplify the reticle manufacturing process. The problem with this approach is that reticle specifications can be reduced only to a certain extent. While reducing reticle specifications does generally result in a cost savings, the savings is not enough. While a further approach has been to research the most cost effective methods, including using laser beam systems to generate reticles, the cost of reticles has continued to increase.

OBJECTS AND SUMMARY

The present invention provides a method which provides that design data is prepared so that it may be used in the creation of a multiple layer reticle. The goal is to keep the mask shop work simple, and keep a high level of control over how the reticle is to be built. Specifically, GDSII data (i.e., design data) is read in, a scribe is built, the design is placed in the scribe, sizing, OPC (optical proximity correction), phase shifting, and Boolean operations are applied to the design and frame data, new cells are created representing each masking image location on the reticle, each new cell is placed in a topcell, and then a gds2 file is produced where the gds2 file can be used to create a reticle or can be used to create reticle making data.

The present invention provides a robust method of preparing design data to be used in the creation of a reticle which contains multiple mask images. The method creates a single mask pattern file per mask layer, allows OPC and mask biasing to be applied in an automated way, and reduces the number of reticles needed, by allowing multiple mask layers to be formed on each reticle.

The method keeps the complexity of multiple layer reticles out of the mask shop, and obviates the need for multiple mask layers for each mask to be handled by the mask shop. The method can be applied to 1×, 4× and 5× reticles, and provides an automated method of preparing mask data. The method eliminates the need for designs to be delayed while waiting for other designs to be completed, and significantly reduces the number of reticles, thereby significantly reducing the cost of a reticle set. Additionally, unlike MCTV, multiple layer reticles do not have the potential of having large areas of the wafer being unusable. The method provides that the finished wafer can be treated the same as a wafer in a standard reticle set. The method maintains a streamlined flow for biasing data and applying OPC, and provides a great amount of control over where each mask layer is placed on each reticle.

BRIEF DESCRIPTION OF THE DRAWINGS

The organization and manner of the structure and operation of the invention, together with further objects and advantages thereof, may best be understood by reference to the following description, taken in connection with the accompanying drawing, wherein:

FIG. 2 illustrates the basic logic behind the present invention;

DESCRIPTION

Figure 1:
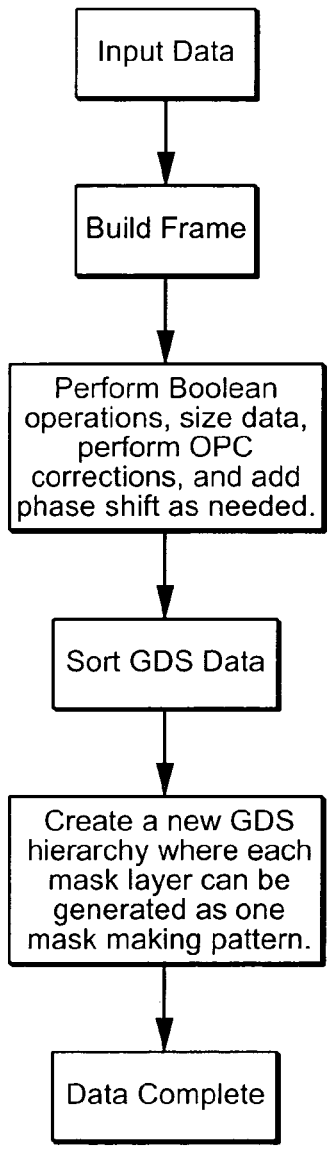
FIGS. 1 and 2 illustrate a method which is in accordance with an embodiment of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

FIG. 1 illustrates a block diagram of a method which is in accordance with an embodiment of the present invention. As shown, design data, i.e., GDSII data is read in, then a scribe or frame is built, and the design is placed in the scribe. Then, Boolean operations, sizing, OPC corrections and phase shifting are performed, as needed, perhaps using third party tools. Then, the GDS data is sorted, and a new GDS hierarchy is created where each mask layer can be generated as one mask making pattern, i.e., new cells are created representing each masking image location on the reticle, each new cell is placed in a topcell, then a gds2 file is produced where the gds2 file can be used to create a reticle or can be used to create reticle making data. The complete flow can be accomplished using a wrapper such as Perl, csh, TCL/TK, etc.

With regard to sorting the GDS data, the goal is to create one GDS2 structure for each mask position on the reticle. With regard to inputs, the input file may be configured to use GDS layers A1 . . . A255 to create mask layers M1 . . . Mm. More than one gds layer A may be used on mask M, and Gds layer A may be used on more than one mask layer M. Z1 . . . Zm may be used to represent the sets of layers A to create each mask M, H0 . . . Hh may be used to represent the hierarchy levels (i.e., the number of levels cells reference other cells), and C0 . . . Cc may be used to represent the cells used in each level of hierarchy.

In the original hierarchy, hierarchy levels H0 . . . Hh may use cells C0 . . . Cc which in turn uses boundaries and paths created in layers A1 . . . A255. In the output of the modified hierarchy, preferably there are X cells, where X equals the number of mask images placed on each reticle. For example, if six mask layers are placed on each reticle, six cells will be created. Each of the cells represents only the layers which are to be positioned at a given location. The X cells consist of only the gds layers, cells, and hierarchy necessary to define the mask images at a given location of the reticle.

Figure 2:
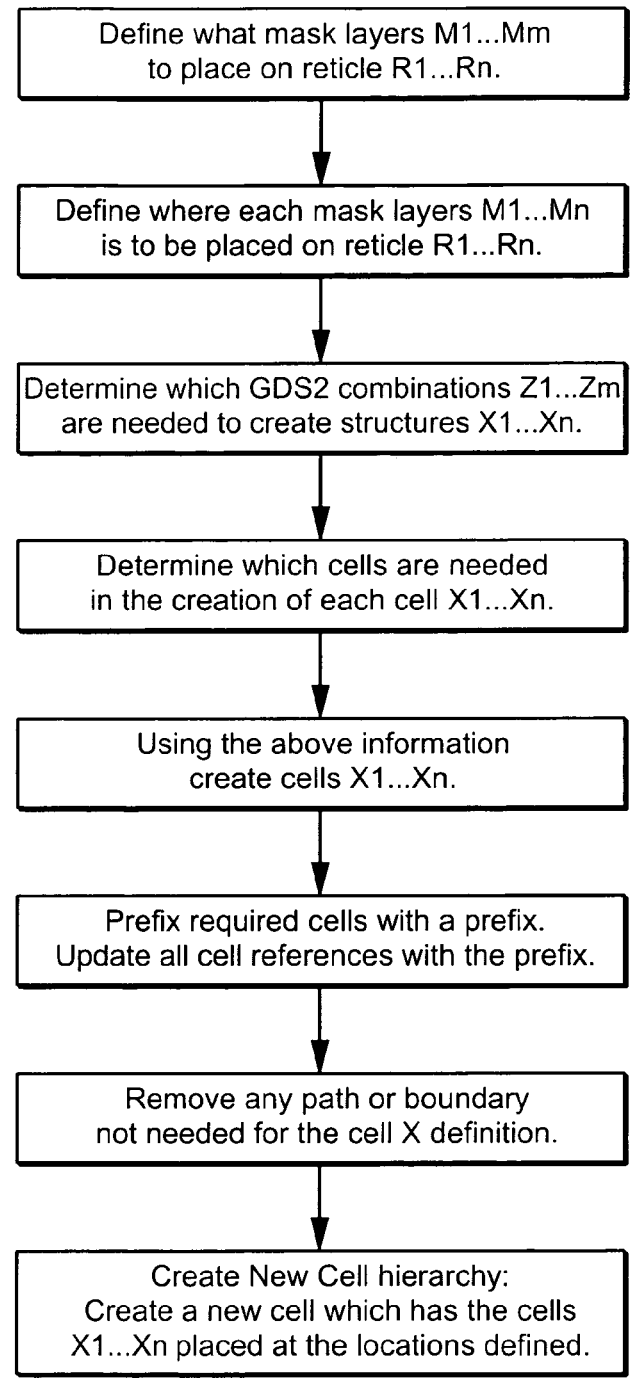

Preferably, the program is configured to add a prefix to each of the cell names and placements used in creating each of the cells X. For example, for the first cell X, the prefix for each cell name may be X1. For the second cell, the prefix may be X2. Adding prefixes to cell names is important because a cell contact typically has multiple definitions within a given gds2 file, and cell X preferably only contains data which is needed to build the mask layers at that given position. The basic logic is illustrated in FIG. 2, and is as follows: define what mask layers M1 . . . Mm to place on reticle R1 . . . Rn, define where each mask layer M1 . . . Mn is to be placed on reticle R1 . . . Rn, determine which gds2 combinations Z1 . . . Zm are needed to create structures X1 . . . Xn, and determine which cells are needed in the creation of each cell X1 . . . Xn. Then, using the above information, create cells X1 . . . Xn, apply prefixes to all required cells, update all cell references with the prefix, and remove any paths or boundaries not needed for the cell X definition. Then, create a new cell which has the cells X1 . . . Xn positioned at the defined locations.

Figure 3:
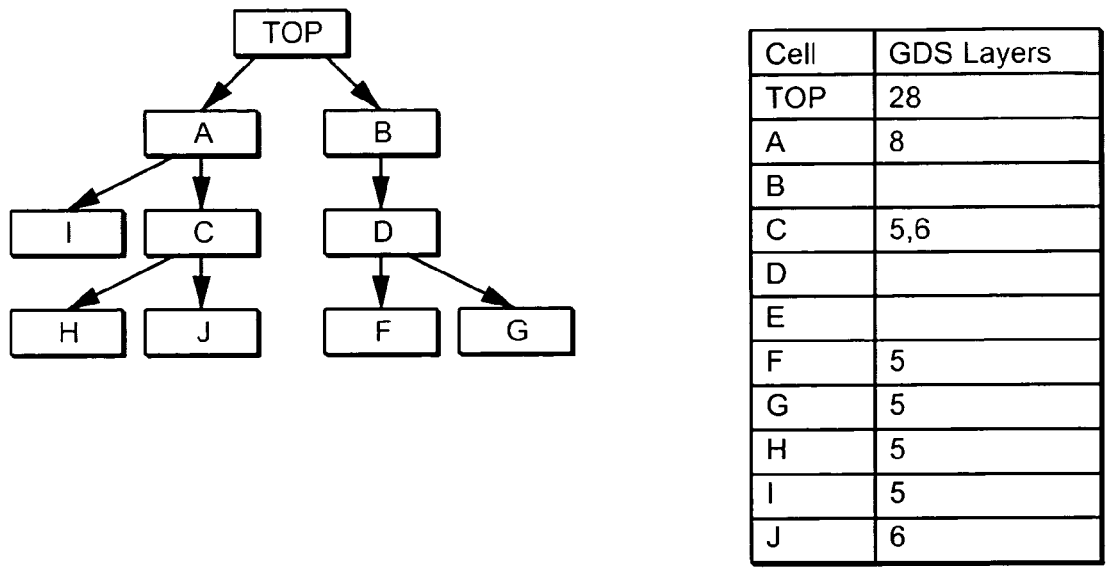
FIG. 3 illustrates an example of a GDS sort, i.e., input GDS2.
Figure 4:
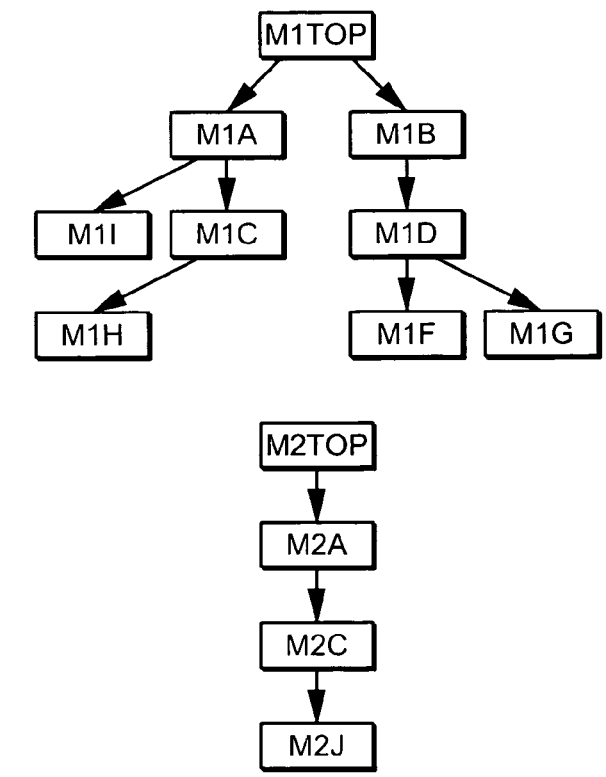
FIG. 4 illustrates the output GDS.

FIG. 3 illustrates an example of a GDS sort (i.e., input GDS2). Assuming mask M1 uses gds2 layers 5, 8, 28, mask M2 uses gds2 layers 6, 28, and masks M1 and M2 are to be placed on the same reticle, FIG. 4 illustrates the output GDS.

Figure 5:
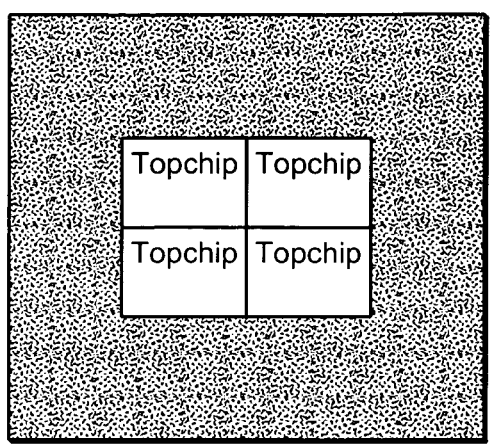
FIG. 5 illustrates two photomasks, and effectively shows a comparison between a standard reticle and a reticle which has been formed using a method in accordance with the present invention.
Figure 5:
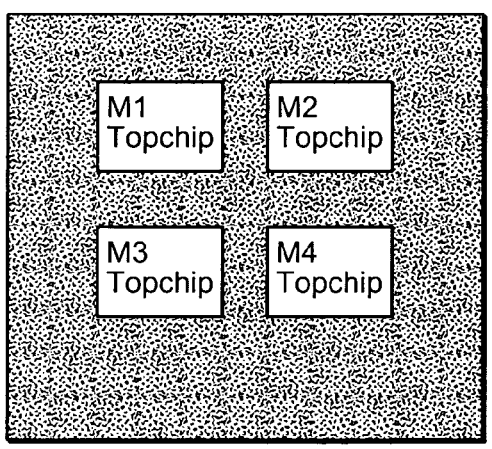

FIG. 5 illustrates two photomasks, and shows a comparison between a standard reticle and a reticle which has been formed using a method in accordance with the present invention.

While an embodiment of the present invention is shown and described, it is envisioned that those skilled in the art may devise various modifications of the present invention without departing from the spirit and scope of the appended claims.

What is claimed is:

1. A method of making a reticle, said method comprising; using design data to construct a scribe, placing a design in the scribe, sorting the design data, creating a design data hierarchy which is configured to provide that each mask layer can be generated as one mask making pattern, applying prefixes to all required cells, and undating all cell references with a prefix.

2. The method as recited in claim 1, wherein the design data comprises (GDSII data and said step of sorting the design data comprises sorting the GDSII data.

3. The method as recited in claim 1, further comprising creating new cells, wherein each of the new cells represents each masking image location on the reticle.

4. The method as recited in claim 3, further comprising adding prefixes to the new cells.

5. The method as recited in claim 3. wherein number of the new cells which are created equals number of mask images placed on each reticle.

6. The method as recited in claim 3, further comprising placing each of the new cells in a topcell.

7. The method as recited in claim 1, further comprising producing a data file where said data file is configured such that it is useable to create a reticle or reticle making data.

8. The method as recited in claim 1, further comprising defining what mask layers to place on each reticle and where each mask layer is to be placed on each reticle.

9. The method as recited in claim 1, further comprising determining which GDS2 combinations are needed to create specified structures.

10. The method as recited in claim 1, further comprising determining which cells are needed to create each cell.

11. The method as recited in claim 1, further comprising removing any paths or boundaries not needed for a predetermined cell definition, and creating a new cell which has the required cells positioned at defined locations.

12. A method of making a reticle, said method comprising: defining what mask layers to place on each reticle and where each mask layer is to be placed on each reticle, determining which GDS2 combinations are needed to create specified structures, determining which cells are needed to create each cell, applying prefixes to all required cells, updating all cell references with a prefix, removing any paths or boundaries not needed for a predetermined cell definition, and creating a new cell which has the required cells positioned at defined locations.

13. The method as recited in claim 12, further comprising using design data to construct a scribe, placing a design in the scribe, sorting the design data, creating a design data hierarchy which is configured to provide that each mask layer can be generated as one mask making pattern.

14. The method as recited in claim 13, wherein the design data comprises GDSII data and said step of sorting the design data comprises sorting the GDSII data.

15. The method as recited in claim 13, further comprising creating new cells, wherein each of the new cells represents each masking image location on the reticle.

16. The method as recited in claim 15, further comprising adding prefixes to the new cells.

17. The method as recited in claim 15, wherein number of the new cells which are created equals the number of mask images placed on each reticle.

18. The meted as recited in claim 15, further comprising placing each of the new cells in a topcell.

19. The method as recited in claim 12, further comprising producing a data file wherein said data file is configured such that it is useable to create a reticle or reticle making data.

20. The method as recited in claim 12, further comprising creating new cells, wherein each of the new cells represents each masking image location on the reticle.

* * * * *